US012776554B2

(12) United States Patent
Kang et al.

(10) Patent No.: US 12,776,554 B2
(45) Date of Patent: Oct. 27, 2026

(54) BATTERY, AND BATTERY PACK AND VEHICLE COMPRISING THE SAME

(71) Applicant: LG ENERGY SOLUTION, LTD., Seoul (KR)

(72) Inventors: Bo-Hyun Kang, Daejeon (KR); Do-Gyun Kim, Daejeon (KR); Geon-Woo Min, Daejeon (KR); Min-Ki Jo, Daejeon (KR); Su-Ji Choi, Daejeon (KR); Kwang-Su Hwangbo, Daejeon (KR); Jae-Woong Kim, Daejeon (KR); Jae-Won Lim, Daejeon (KR); Hak-Kyun Kim, Daejeon (KR); Je-Jun Lee, Daejeon (KR); Ji-Min Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 571 days.

(21) Appl. No.: 18/277,953

(22) PCT Filed: Feb. 18, 2022

(86) PCT No.: PCT/KR2022/002462

§ 371 (c)(1),
(2) Date: Aug. 18, 2023

(87) PCT Pub. No.: WO2022/177371

PCT Pub. Date: Aug. 25, 2022

(65) Prior Publication Data

US 2024/0128608 A1 Apr. 18, 2024

(30) Foreign Application Priority Data

Feb. 19, 2021 (KR) ........................ 10-2021-0022842
Feb. 19, 2021 (KR) ........................ 10-2021-0022881

(Continued)

(51) Int. Cl.
*H01M 50/55* (2021.01)
*H01M 10/04* (2006.01)

(Continued)

(52) U.S. Cl.
CPC ....... *H01M 50/55* (2021.01); *H01M 10/0422* (2013.01); *H01M 10/0431* (2013.01);

(Continued)

(58) Field of Classification Search
None
See application file for complete search history.

(56) References Cited

U.S. PATENT DOCUMENTS 4,322,484 A 3/1982 Sugalski
4,563,551 A 1/1986 Black et al.

(Continued)

FOREIGN PATENT DOCUMENTS

CN 1444303 A 9/2003
CN 2681364 Y † 2/2005

(Continued)

OTHER PUBLICATIONS

Third Party Observation for European Application No. 22756569.4, dated Jun. 6, 2024.

(Continued)

*Primary Examiner* — Basia A Ridley
*Assistant Examiner* — Heng M. Chan
(74) *Attorney, Agent, or Firm* — Birch, Stewart, Kolasch & Birch, LLP

(57) ABSTRACT

A battery includes an electrode assembly including a first uncoated region and a second uncoated region; a battery housing accommodating the electrode assembly and electrically connected to the second uncoated region; a cap to cover an open portion on bottom of the battery housing; a first electrode terminal passing through a partially closed (Continued)

portion of the battery housing and being electrically isolated from the battery housing; and a first current collector coupled to the first uncoated region and connected to the first electrode terminal.

35 Claims, 15 Drawing Sheets

(30) Foreign Application Priority Data

| | | | |
|---|---|---|---|
| Feb. 19, 2021 | (KR) | ........................ | 10-2021-0022894 |
| Mar. 8, 2021 | (KR) | ........................ | 10-2021-0030291 |
| Sep. 17, 2021 | (KR) | ........................ | 10-2021-0124988 |
| Oct. 1, 2021 | (KR) | ........................ | 10-2021-0131207 |
| Oct. 1, 2021 | (KR) | ........................ | 10-2021-0131208 |
| Oct. 1, 2021 | (KR) | ........................ | 10-2021-0131215 |

(51) Int. Cl.

| | |
|---|---|
| ***H01M 50/107*** | (2021.01) |
| ***H01M 50/152*** | (2021.01) |
| ***H01M 50/167*** | (2021.01) |
| ***H01M 50/179*** | (2021.01) |
| ***H01M 50/213*** | (2021.01) |
| ***H01M 50/503*** | (2021.01) |
| ***H01M 50/509*** | (2021.01) |
| ***H01M 50/533*** | (2021.01) |
| ***H01M 50/536*** | (2021.01) |
| ***H01M 50/545*** | (2021.01) |
| ***H01M 50/559*** | (2021.01) |
| ***H01M 50/567*** | (2021.01) |
| ***H01M 50/586*** | (2021.01) |
| ***H01M 50/59*** | (2021.01) |

(52) U.S. Cl.

CPC ....... *H01M 50/107* (2021.01); *H01M 50/152* (2021.01); *H01M 50/167* (2021.01); *H01M 50/179* (2021.01); *H01M 50/213* (2021.01); *H01M 50/503* (2021.01); *H01M 50/509* (2021.01); *H01M 50/533* (2021.01); *H01M 50/536* (2021.01); *H01M 50/545* (2021.01); *H01M 50/559* (2021.01); *H01M 50/567* (2021.01); *H01M 50/586* (2021.01); *H01M 50/59* (2021.01); *H01M 2220/20* (2013.01)

(56) References Cited

U.S. PATENT DOCUMENTS

| | | | |
|---|---|---|---|
| 5,665,483 | A | 9/1997 | Saito et al. |
| 6,132,900 | A | 10/2000 | Yoshizawa et al. |
| 6,653,017 | B2 | 11/2003 | Satoh et al. |
| 8,580,425 | B2 | 11/2013 | Kim |
| 2001/0004505 | A1 | 6/2001 | Kim et al. |
| 2001/0051297 | A1 | 12/2001 | Nemoto et al. |
| 2002/0004162 | A1 | 1/2002 | Satoh et al. |
| 2002/0058184 | A1 | 5/2002 | Hayashi et al. |
| 2002/0110729 | A1 | 8/2002 | Hozumi et al. |
| 2003/0104276 | A1 | 6/2003 | Mizuno et al. |
| 2004/0023108 | A1 | 2/2004 | Nakanishi et al. |
| 2005/0048365 | A1 | 3/2005 | Miyahisa et al. |
| 2005/0118499 | A1 | 6/2005 | Kim |
| 2005/0158620 | A1 | 7/2005 | Kim et al. |
| 2005/0214640 | A1 | 9/2005 | Kim |
| 2005/0238951 | A1 | 10/2005 | Yoo et al. |
| 2005/0260487 | A1 | 11/2005 | Kim et al. |
| 2005/0287428 | A1 | 12/2005 | Cheon et al. |
| 2006/0063063 | A1 | 3/2006 | Mori et al. |
| 2006/0204841 | A1 | 9/2006 | Satoh et al. |
| 2009/0011329 | A1 | 1/2009 | Yoon |
| 2009/0087733 | A1 | 4/2009 | Yoon et al. |
| 2010/0055548 | A1 | 3/2010 | Matsumoto et al. |
| 2010/0151317 | A1 | 6/2010 | Kim et al. |
| 2010/0216001 | A1 | 8/2010 | Byun et al. |
| 2010/0316897 | A1 | 12/2010 | Kozuki et al. |
| 2011/0027644 | A1 | 2/2011 | Kiyama |
| 2011/0086252 | A1 | 4/2011 | Phillips |
| 2011/0256433 | A1 | 10/2011 | Fuhr et al. |
| 2011/0281155 | A1 | 11/2011 | Ito et al. |
| 2012/0100406 | A1 | 4/2012 | Gaugler |
| 2012/0100419 | A1 | 4/2012 | Byun et al. |
| 2012/0328932 | A1 | 12/2012 | Guen et al. |
| 2013/0183556 | A1 | 7/2013 | Kim |
| 2013/0273401 | A1 | 10/2013 | Lee et al. |
| 2013/0323574 | A1 | 12/2013 | Tsunaki et al. |
| 2014/0205868 | A1 | 7/2014 | Phillips |
| 2014/0212695 | A1 | 7/2014 | Lane et al. |
| 2014/0308554 | A1 | 10/2014 | Khakhalev |
| 2015/0004446 | A1 | 1/2015 | Kim et al. |
| 2015/0104694 | A1 | 4/2015 | Okuda et al. |
| 2015/0155532 | A1 | 6/2015 | Harayama et al. |
| 2016/0155998 | A1 | 6/2016 | Wakimoto et al. |
| 2016/0181577 | A1 | 6/2016 | Kajiwara et al. |
| 2017/0062789 | A1 | 3/2017 | Sim et al. |
| 2017/0149042 | A1 | 5/2017 | Koo et al. |
| 2017/0256769 | A1 | 9/2017 | Wynn et al. |
| 2017/0271643 | A1 | 9/2017 | Wintner |
| 2018/0062123 | A1 | 3/2018 | Ikeda et al. |
| 2018/0130995 | A1 | 5/2018 | Nemoto et al. |
| 2018/0182560 | A1 | 6/2018 | Khakhalev |
| 2018/0294447 | A1 | 10/2018 | Guo et al. |
| 2018/0375162 | A1 | 12/2018 | Wakimoto et al. |
| 2019/0221791 | A1 | 7/2019 | Wakimoto |
| 2019/0355958 | A1 | 11/2019 | Tsuji et al. |
| 2019/0363341 | A1 | 11/2019 | Dellinger et al. |
| 2019/0386272 | A1 | 12/2019 | Shin et al. |
| 2020/0044289 | A1 | 2/2020 | Pasma et al. |
| 2020/0119328 | A1 | 4/2020 | Zheng et al. |
| 2020/0127249 | A1 | 4/2020 | Yoon et al. |
| 2020/0212374 | A1 | 7/2020 | Gaugler |
| 2020/0227698 | A1 | 7/2020 | Muratsu et al. |
| 2020/0235369 | A1 | 7/2020 | Jeong et al. |
| 2020/0295341 | A1 | 9/2020 | Kim et al. |
| 2021/0039195 | A1 | 2/2021 | Jost et al. |
| 2021/0075051 | A1 | 3/2021 | Zhou |
| 2021/0257652 | A1 | 8/2021 | Ko et al. |
| 2021/0280835 | A1 | 9/2021 | Peng et al. |
| 2022/0037712 | A1 | 2/2022 | Kritzer et al. |
| 2022/0037747 | A1 | 2/2022 | Lee |
| 2022/0069335 | A1 | 3/2022 | Kim |
| 2022/0094021 | A1 | 3/2022 | Ishikawa |
| 2023/0246223 | A1 | 8/2023 | Wu et al. |
| 2024/0322399 | A1 | 9/2024 | Min et al. |
| 2024/0356123 | A1 | 10/2024 | Ko et al. |

FOREIGN PATENT DOCUMENTS

| | | | | |
|---|---|---|---|---|
| CN | 1713440 | A | | 12/2005 |
| CN | 1832228 | A | | 9/2006 |
| CN | 100349321 | C | † | 11/2007 |
| CN | 101083317 | A | † | 12/2007 |
| CN | 201066701 | Y | | 5/2008 |
| CN | 201117731 | Y | † | 9/2008 |
| CN | 101404338 | A | † | 4/2009 |
| CN | 201466087 | U | | 5/2010 |
| CN | 201725845 | U | | 1/2011 |
| CN | 201781028 | U | | 3/2011 |
| CN | 102217116 | A | † | 10/2011 |
| CN | 103427063 | A | | 12/2013 |
| CN | 104396044 | A | | 3/2015 |
| CN | 204230370 | U | | 3/2015 |
| CN | 204596910 | U | | 8/2015 |
| CN | 105655623 | A | | 6/2016 |
| CN | 205863251 | U | | 1/2017 |
| CN | 206461019 | U | † | 9/2017 |
| CN | 206461044 | U | | 9/2017 |
| CN | 206619636 | U | | 11/2017 |
| CN | 107482156 | A | | 12/2017 |
| CN | 207217654 | U | | 4/2018 |
| CN | 108063192 | A | | 5/2018 |

(56) References Cited

FOREIGN PATENT DOCUMENTS

| | | | | |
|---|---|---|---|---|
| CN | 108695451 | A | † | 10/2018 |
| CN | 110048065 | A | | 7/2019 |
| CN | 110459705 | A | | 11/2019 |
| CN | 209912959 | U | | 1/2020 |
| CN | 111033807 | A | † | 4/2020 |
| CN | 111446386 | A | | 7/2020 |
| CN | 111668534 | A | | 9/2020 |
| CN | 111952525 | A | | 11/2020 |
| CN | 211879534 | U | | 11/2020 |
| CN | 212136494 | U | | 12/2020 |
| CN | 112310574 | A | | 2/2021 |
| CN | 112335075 | A | † | 2/2021 |
| CN | 215342666 | U | | 12/2021 |
| CN | 114865242 | A | | 8/2022 |
| DE | 10 2018 130 173 | A1 | | 5/2020 |
| EP | 2 876 338 | A1 | | 5/2015 |
| EP | 3 933 994 | A1 | | 1/2022 |
| EP | 4 087 034 | A1 | | 11/2022 |
| EP | 4 336 649 | A1 | | 3/2024 |
| GB | 1191105 | A | | 5/1970 |
| JP | 8-102313 | A | | 4/1996 |
| JP | 8-180849 | A | | 7/1996 |
| JP | 10-106532 | A | | 4/1998 |
| JP | 11-67279 | A | | 3/1999 |
| JP | 11-297301 | A | | 10/1999 |
| JP | 2955135 | B2 | | 10/1999 |
| JP | 2000-58024 | A | | 2/2000 |
| JP | 2000260417 | A | * | 9/2000 |
| JP | 2001-15098 | A | | 1/2001 |
| JP | 2001-28274 | A | | 1/2001 |
| JP | 2003-203621 | A | | 7/2003 |
| JP | 2004-14173 | A | | 1/2004 |
| JP | 2004-111362 | A | | 4/2004 |
| JP | 2005-100927 | A | | 4/2005 |
| JP | 2005-276840 | A | | 10/2005 |
| JP | 3718872 | B2 | | 11/2005 |
| JP | 2006-120606 | A | | 5/2006 |
| JP | 2008-192552 | A | | 8/2008 |
| JP | 2009-110885 | A | | 5/2009 |
| JP | 2009-259452 | A | | 11/2009 |
| JP | 4401634 | B2 | | 1/2010 |
| JP | 2010-33940 | A | | 2/2010 |
| JP | 2010-61892 | A | | 3/2010 |
| JP | 2011-159582 | A | | 8/2011 |
| JP | 2014-41791 | A | | 3/2014 |
| JP | 2015-106613 | A | | 6/2015 |
| JP | 5877724 | B2 | | 3/2016 |
| JP | 2016-100323 | A | | 5/2016 |
| JP | 5935878 | B2 | | 6/2016 |
| JP | 2016-195014 | A | | 11/2016 |
| JP | 2016-195025 | A | | 11/2016 |
| JP | 2016-195036 | A | | 11/2016 |
| JP | 2016-225014 | A | | 12/2016 |
| JP | 2019-46639 | A | | 3/2019 |
| JP | 2020-71898 | A | | 5/2020 |
| JP | 6735445 | B2 | | 8/2020 |
| KR | 10-2001-0038811 | A | | 5/2001 |
| KR | 2001-0056363 | A | | 7/2001 |
| KR | 10-2005-0121914 | A | | 12/2005 |
| KR | 10-2006-0022128 | A | | 3/2006 |
| KR | 10-2010-0068080 | A | | 6/2010 |
| KR | 10-2010-0089092 | A | | 8/2010 |
| KR | 10-1023865 | B1 | | 3/2011 |
| KR | 10-1147175 | B1 | | 5/2012 |
| KR | 10-2013-0084086 | A | | 7/2013 |
| KR | 10-1320581 | B1 | | 10/2013 |
| KR | 10-1446151 | B1 | | 10/2014 |
| KR | 10-1514827 | B1 | | 4/2015 |
| KR | 10-2015-0134566 | A | | 12/2015 |
| KR | 10-2016-0043725 | A | | 4/2016 |
| KR | 10-1679413 | B1 | | 11/2016 |
| KR | 10-2017-0025074 | A | | 3/2017 |
| KR | 10-2017-0033543 | A | | 3/2017 |
| KR | 10-1743136 | B1 | | 6/2017 |
| KR | 10-1839158 | B1 | | 3/2018 |
| KR | 10-2018-0087606 | A | | 8/2018 |
| KR | 10-2018-0129115 | A | | 12/2018 |
| KR | 10-2019-0040699 | A | | 4/2019 |
| KR | 10-2019-0078094 | A | | 7/2019 |
| KR | 10-2020-0007561 | A | | 1/2020 |
| KR | 10-2020-0020173 | A | | 2/2020 |
| KR | 10-2020-0035739 | A | | 4/2020 |
| KR | 10-2020-0037599 | A | | 4/2020 |
| KR | 10-2020-0039214 | A | | 4/2020 |
| KR | 10-2126970 | B1 | | 6/2020 |
| WO | WO 01/24206 | A1 | | 4/2001 |
| WO | WO 2006/085437 | A1 | | 8/2006 |
| WO | WO 2010/146154 | A2 | | 12/2010 |
| WO | WO 2013/024774 | A1 | | 2/2013 |
| WO | WO 2015/025388 | A1 | | 2/2015 |
| WO | WO 2020/174954 | A1 | | 9/2020 |

OTHER PUBLICATIONS

Extended European Search Report for European Application No. 22756569.4, dated Jun. 5, 2025.

U.S. Office Action for U.S. Appl. No. 17/592,576, dated Mar. 31, 2025.

"What is the "Tabless Battery" Tesla Unveiled?," Donga—A Science, URL: <https://www.dongascience.com/print.php?idx=40048>, Sep. 23, 2020, 6 pages total, with English translation.

European Communication pursuant to Article 94(3) EPC for European Application No. 23 215 214.0, dated Nov. 21, 2024.

Extended European Search Report for European Application No. 22742834.9, dated Feb. 10, 2025.

Partial Supplementary European Search Report for European Application No. 22742840.6, dated Jul. 15, 2024.

Third Party Observation for European Application No. 22742834.9, dated Apr. 25, 2024.

Third Party Observation for European Application No. 22742834.9, dated Feb. 13, 2024.

Third Party Observation for European Application No. 22742840.6, dated Feb. 5, 2024.

Third Party Observation for European Application No. 22742840.6, dated Apr. 17, 2024.

Third Party Submission for U.S. Appl. No. 17/592,576, dated Apr. 4, 2024.

U.S. Office Action for U.S. Appl. No. 17/592,576, dated Oct. 17, 2024.

U.S. Office Action for U.S. Appl. No. 17/592,594, dated Nov. 24, 2023.

U.S. Office Action for U.S. Appl. No. 18/086,402, dated Jun. 12, 2024.

U.S. Office Action for U.S. Appl. No. 18/086,402, dated Oct. 28, 2024.

International Search Report for PCT/KR2022/002462 (PCT/ISA/210) mailed on Jun. 17, 2022.

Third Party Observation for European Application No. 22756569.4, dated May 27, 2024.

* cited by examiner
† cited by third party

BATTERY, AND BATTERY PACK AND VEHICLE COMPRISING THE SAME

TECHNICAL FIELD

The present disclosure relates to a battery and a battery pack and a vehicle comprising the same. More particularly, the present disclosure relates to a battery having a structure in which a positive electrode terminal and a negative electrode terminal are arranged close to each other on one side of the battery without greatly changing the structure of the conventional battery, and a battery pack and a vehicle comprising the same.

The present application claims the benefit of Korean Patent Application No. 10-2021-0022881 filed on Feb. 19, 2021, Korean Patent Application No. 10-2021-0022894 filed on Feb. 19, 2021, Korean Patent Application No. 10-2021-0022842 filed on Feb. 19, 2021, Korean Patent Application No. 10-2021-0030291 filed on Mar. 8, 2021, Korean Patent Application No. 10-2021-0124988 filed on Sep. 17, 2021, Korean Patent Application No. 10-2021-0131208 filed on Oct. 1, 2021, Korean Patent Application No. 10-2021-0131207 filed on Oct. 1, 2021, and Korean Patent Application No. 10-2021-0131215 filed on Oct. 1, 2021 with the Korean Intellectual Property Office, the disclosure of which is incorporated herein by reference in its entirety.

BACKGROUND ART

When manufacturing a battery pack using cylindrical batteries, in general, the plurality of cylindrical batteries is placed upright in a housing and electrically connected to each other using the top and bottom of the cylindrical battery as a positive electrode terminal and a negative electrode terminal, respectively.

In the cylindrical battery, a negative electrode uncoated region of an electrode assembly accommodated in a battery housing is extend downward and electrically connected to the bottom of the battery housing, and a positive electrode uncoated region is extended upward and electrically connected to a top cap. That is, in the cylindrical battery, it is general that the bottom surface of the battery housing, i.e., the outer surface of the closed portion of the battery housing, is used as the negative electrode terminal, and the top cap that covers the top open portion of the battery housing is used as the positive electrode terminal.

However, when the positive electrode terminal and the negative electrode terminal of the cylindrical battery are arranged on the opposite sides, it is necessary to apply an electrical connection component for electrically connecting the plurality of cylindrical batteries such as a busbar to both the top and bottom of the cylindrical battery. This makes the electrical connection structure of the battery pack complex.

Besides, under this structure, a component for insulation and a component for waterproofing should be individually applied to the top and bottom of the battery pack, causing the increased number of components applied and structural complexity.

Accordingly, there is a need for the development of a cylindrical battery having a structure in which the positive electrode terminal and the negative electrode terminal are applied in the same direction to simplify the electrical connection structure of the plurality of cylindrical batteries.

DISCLOSURE

Technical Problem

The present disclosure is designed to solve the above-described problem, and therefore the present disclosure is directed to providing a battery structure having a structure in which a positive electrode terminal and a negative electrode terminal are applied in the same direction.

The present disclosure is directed to providing a battery in which a negative electrode terminal applied in the same direction has a sufficient area for welding with an electrical connection component such as a busbar for manufacturing a battery pack.

However, the technical problem of the present disclosure is not limited to the above-described problem, and other problems not mentioned herein will be clearly understood by those skilled in the art from the following description.

Technical Solution

To solve the above-described problem, a battery according to an embodiment of the present disclosure includes an electrode assembly including a first electrode, a second electrode and a separator between the first electrode and the second electrode, the first electrode, the second electrode and the separator being wound around a winding axis to define a core and an outer circumferential surface of the electrode assembly, wherein the first electrode and the second electrode include a first uncoated region and a second uncoated region in which an active material layer is not coated along a winding direction, respectively; a battery housing accommodating the electrode assembly therein, the battery housing being electrically connected to the second uncoated region, the battery housing having an open portion and a partially closed portion opposite the open portion; a cap covering the open portion of the battery housing; a first electrode terminal passing through the partially closed portion of the battery housing, the first electrode terminal being electrically isolated from the battery housing, the first electrode terminal having a first polarity; and a first current collector coupled to the first uncoated region and connected to the first electrode terminal.

The first electrode terminal and the first current collector may be thread coupled.

The first electrode terminal may include a terminal exposure portion exposed beyond the battery housing; and a terminal coupling portion coupled to the first current collector through the partially closed portion of the battery housing.

The first current collector may include a current collector coupling portion thread coupled to the terminal coupling portion.

The current collector coupling portion may include a hole or a groove at a center thereof.

An inner diameter of the current collector coupling portion may be equal to or smaller than an inner diameter of the core of the electrode assembly.

The terminal coupling portion may be inserted into and thread coupled to the current collector coupling portion.

The current collector coupling portion may be inserted into and thread coupled to the terminal coupling portion.

The current collector coupling portion may be at a center of the first current collector.

The current collector coupling portion may be at a location corresponding to the core of the electrode assembly.

The first electrode terminal may further include a flange portion riveted to an inner surface of the battery housing through the partially closed portion of the battery housing.

The battery may further include an insulation gasket between the battery housing and the first electrode terminal.

The first electrode terminal may include a terminal exposure portion exposed beyond the battery housing; and a terminal coupling portion coupled to the first current collector through the partially closed portion of the battery housing.

The insulation gasket may cover an outer circumferential surface of the terminal exposure portion.

The insulation gasket may be coupled to the battery housing and the first electrode terminal by heat fusion.

The first electrode terminal may be coupled to the insulation gasket by insert injection molding.

The battery may further include an insulation gasket between the battery housing and the first electrode terminal, and the flange portion may be bent towards the battery housing such that the insulation gasket may be located between the inner surface of the partially closed portion of the battery housing and the flange portion.

An outer surface of the partially closed portion of the battery housing may define a second electrode terminal having a second polarity opposite to the first polarity of the first electrode terminal.

At least part of the first uncoated region may include a plurality of segments split along the winding direction of the electrode assembly, and the plurality of segments may be bent along a radial direction of the electrode assembly.

The plurality of bent segments may overlap in multiple layers along the radial direction.

The electrode assembly may have a welding target area in which the number of overlapping segments of the first uncoated region is maintained constant along the radial direction of the electrode assembly, and a lower surface of the first current collector may be coupled to the first uncoated region in the welding target area by welding.

The battery may further include a second current collector coupled to the second uncoated region and may be electrically connected to the battery housing.

The second current collector may include an uncoated region coupling portion coupled to the second uncoated region; and a housing coupling portion coupled to an inner surface of the battery housing.

The second current collector may include a current collector hole at a location corresponding to a hole at the core of the electrode assembly.

The battery housing may include a beading portion adjacent an end of the open portion; and a crimping portion bent inward to provide an end defining the open portion, the end of the crimping portion may overlap an edge of the cap below the beading portion, and the housing coupling portion may be electrically coupled to one surface of the beading portion facing the cap.

The battery may include a plurality of the housing coupling portions to distribute an electrical connection between the electrode assembly and the battery housing.

A resistance measured between the first electrode and the second electrode may be 4 milliohms or less.

A ratio of a diameter of the battery to a height of the battery may be larger than 0.4.

To solve the above-described problem, a battery pack according to an embodiment of the present disclosure includes a plurality of batteries according to an embodiment of the present disclosure as described above.

The plurality of batteries may be arranged in a predetermined number of columns, and the first electrode terminal and the outer surface of the partially closed portion of the battery housing of each battery may be positioned upward.

The battery pack may include a plurality of busbars connecting the plurality of batteries in series and in parallel, and the plurality of busbars may be arranged on the plurality of batteries. In this case, each busbar may include a body portion extending between the first electrode terminals of the adjacent batteries; a plurality of first busbar terminals extending from a first side of the body portion and may be electrically coupled to the first electrode terminals of the batteries arranged on the first side; and a plurality of second busbar terminals extending from a second side of the body portion opposite the first side and may be electrically coupled to the outer surfaces of the partially closed portions of the battery housings of the batteries arranged on the second side.

To solve the above-described problem, a vehicle according to an embodiment of the present disclosure includes the battery pack according to an embodiment of the present disclosure as described above.

To solve the above-described problem, a method of manufacturing a battery according to an embodiment of the present disclosure may include providing an electrode assembly including a first electrode, a second electrode and a separator between the first electrode and the second electrode, the first electrode, the second electrode and the separator being wound around a winding axis to define a core and an outer circumferential surface of the electrode assembly, wherein the first electrode and the second electrode include a first uncoated region and a second uncoated region in which an active material layer is not coated along a winding direction, respectively; coupling a first current collector to the first uncoated region; providing a battery housing having an open portion and a partially closed portion opposite the open portion; attaching a first electrode terminal through the partially closed portion of the battery housing; and inserting the electrode assembly and the coupled first current collector through the open portion and thread coupling the first electrode terminal to the first current collector.

Advantageous Effects

According to an aspect of the present disclosure, it is possible to provide a battery structure having a structure in which a positive electrode terminal and a negative electrode terminal are applied in the same direction, thereby simplifying an electrical connection structure of a plurality of batteries.

According to another aspect of the present disclosure, it is possible to provide a battery in which a negative electrode terminal has a sufficient area for welding with an electrical connection component such as a busbar, thereby ensuring a sufficient bonding strength between the negative electrode terminal and the electrical connection component and reducing the resistance at the joined part of the electrical connection component and the negative electrode terminal down to a desirable level.

DESCRIPTION OF DRAWINGS

The accompanying drawings illustrate an exemplary embodiment of the present disclosure, and together with the following detailed description, serve to provide a further understanding of the technical aspects of the present disclosure, and thus the present disclosure should not be construed as being limited to the drawings.

BEST MODE

Figure 1:
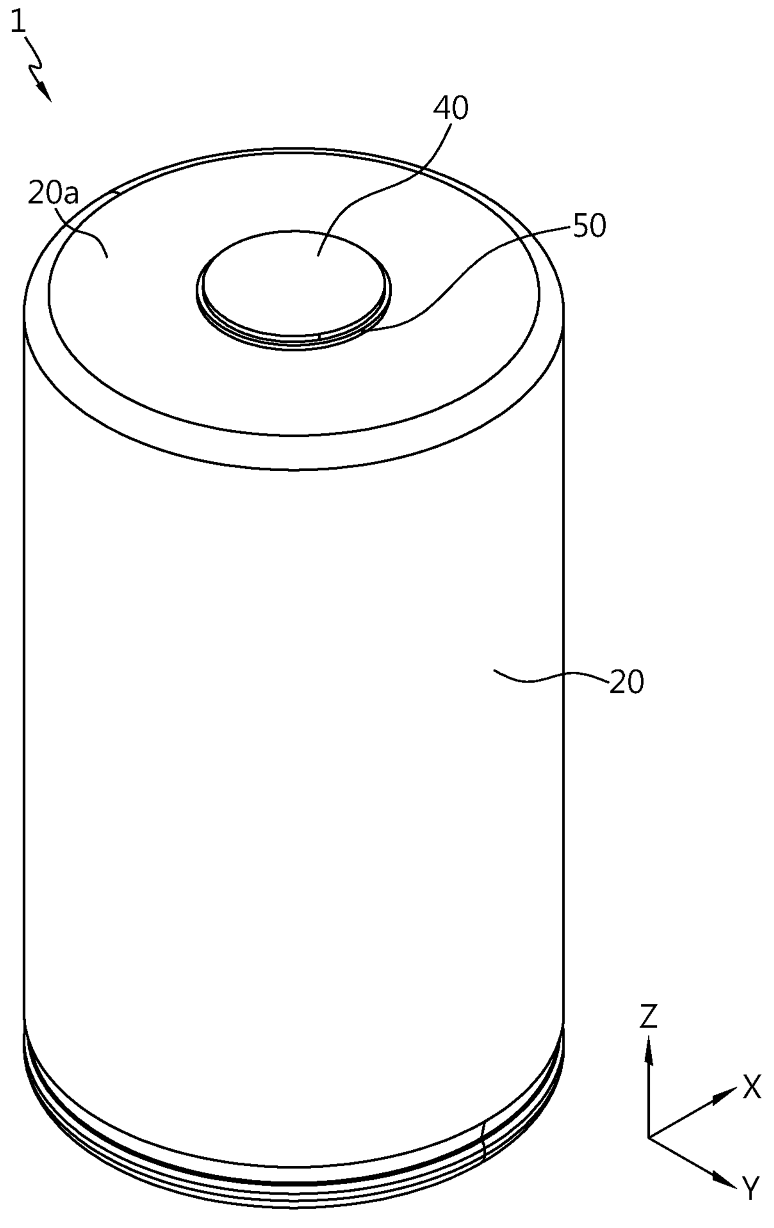
FIG. 1 is a diagram showing an appearance of a cylindrical battery according to an embodiment of the present disclosure.

Hereinafter, exemplary embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just some of the exemplary embodiments of the present disclosure, but not intended to fully describe the technical aspects of the present disclosure, so it should be understood that a variety of other equivalents and modifications could have been made thereto at the time that the application was filed.

In addition, to help the understanding of the present disclosure, the accompanying drawings may illustrate some elements in exaggerated dimensions, not in actual scale. Furthermore, the same element in different embodiments may be given the same reference numeral.

The term 'equal' means 'substantially equal'. Accordingly, 'substantially equal' may include the deviation regarded as a low level in the corresponding technical field, for example, the deviation of 5% or less. In addition, uniformity of a certain parameter in a predetermined region may mean uniformity in terms of an average.

Although the terms first, second or the like are used to describe different elements, these elements are not limited by the terms. These terms are used to distinguish one element from another, and unless stated to the contrary, a first element may be a second element.

Throughout the specification, unless stated otherwise, each element may be singular or plural.

When an element is "above (or under)" or "on (or below)" another element, the element can be on an upper surface (or a lower surface) of the other element, and intervening elements may be present between the element and the other element on (or below) the element.

Additionally, when an element is referred to as being "connected", "coupled" or "linked" to another element, the element can be directly connected or coupled to the other element, but it should be understood that intervening elements may be present between each element, or each element may be "connected", "coupled" or "linked" to each other through another element.

Throughout the specification, "A and/or B" refers to either A or B or both unless expressly stated otherwise, and "C to D" refers to C or greater and D or smaller unless expressly stated otherwise.

Figure 2:
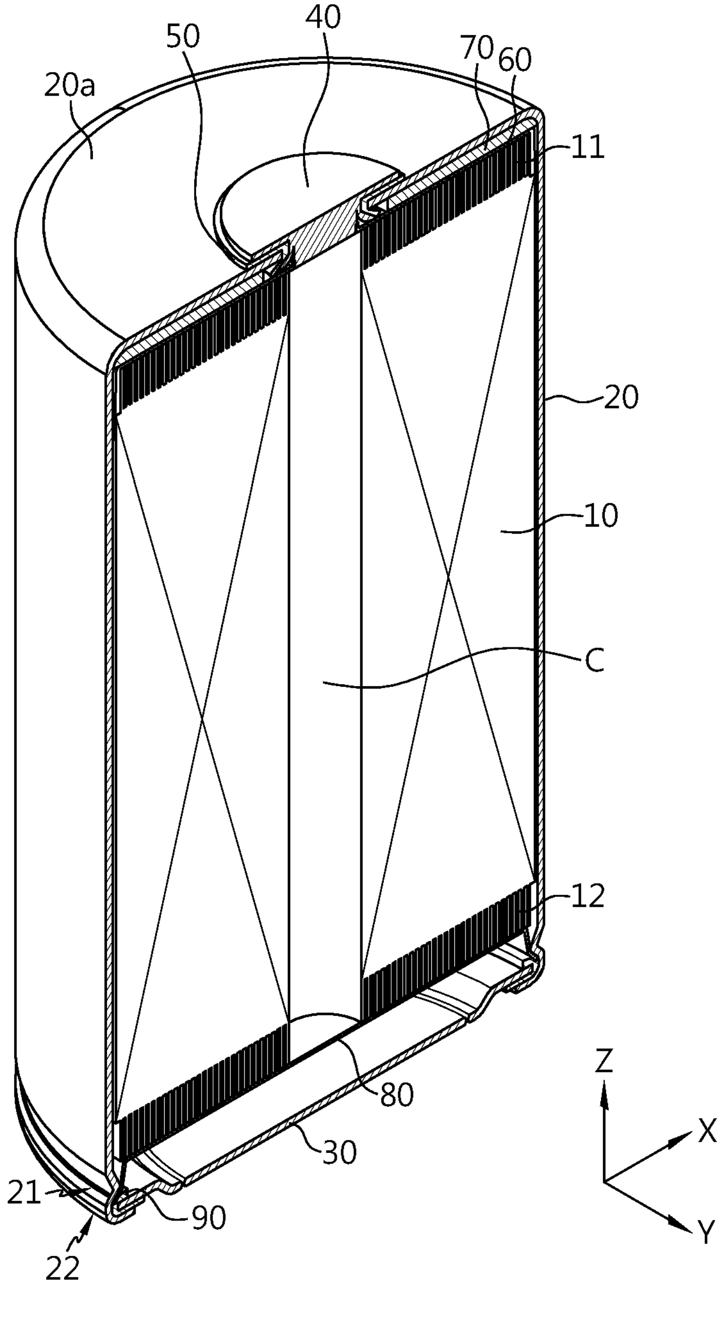
FIG. 2 is a cross-sectional view showing an internal structure of a cylindrical battery according to an embodiment of the present disclosure.
Figure 3:
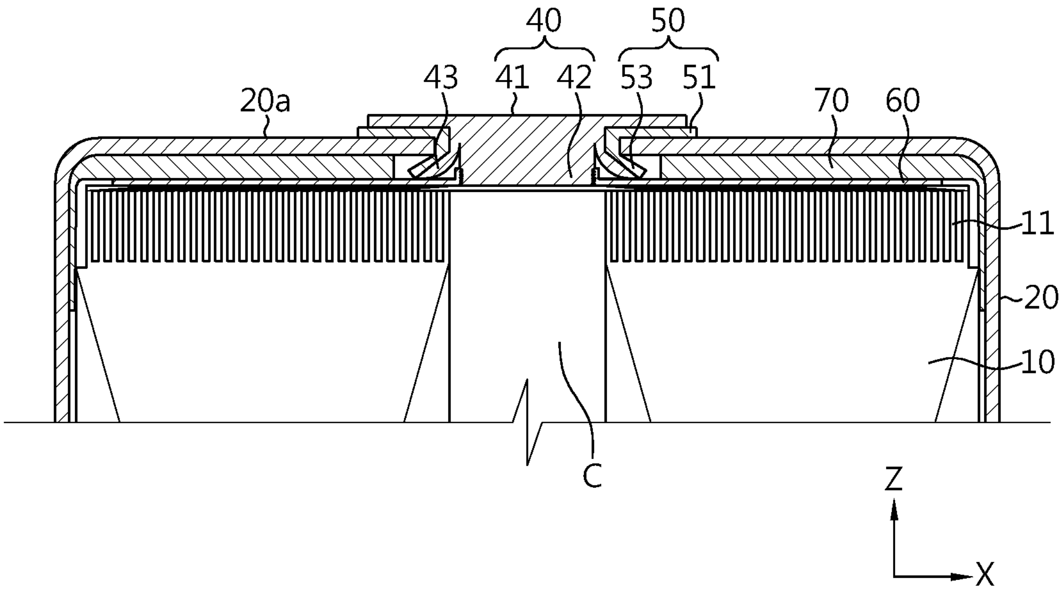
FIGS. 3 and 4 are partial cross-sectional views showing a top structure of a battery according to an embodiment of the present disclosure.

Referring to FIGS. 1 to 3, a battery 1 according to an embodiment of the present disclosure may be, for example, a cylindrical battery. The cylindrical battery 1 includes an electrode assembly 10, a battery housing 20, a cap 30, a first electrode terminal 40 and a first current collector 60. In addition to the above-described elements, the cylindrical battery 1 may further include an insulation gasket 50 and/or an insulator 70 and/or a second current collector 80 and/or a sealing gasket 90. The present disclosure is not limited by the shape of the battery, and may be applied to batteries of other shapes, for example, prismatic batteries.

The electrode assembly 10 includes a first uncoated region 11 and a second uncoated region 12. The electrode assembly 10 includes a first electrode having a first polarity, a second electrode having a second polarity and a separator between the first electrode and the second electrode. The first electrode corresponds to a negative or positive electrode, and the second electrode corresponds to an electrode having the opposite polarity to the first electrode.

The electrode assembly 10 may have, for example, a jelly-roll shape. That is, the electrode assembly 10 may be manufactured by winding a stack formed by stacking the first electrode, the separator and the second electrode at least once in that order. The jelly-roll type electrode assembly 10 may have a winding center hole extended along the heightwise direction (parallel to the Z axis) at a winding center C. Meanwhile, the electrode assembly 10 may include an additional separator for insulation from the battery housing 20 on the outer circumferential surface thereof.

The first electrode includes a first conductive substrate and a first electrode active material layer formed on one or two surfaces of the first conductive substrate by coating. A first electrode uncoated region in which a first electrode active material is not coated exists at one end of the first conductive substrate in the widthwise direction (parallel to the Z axis). The first electrode uncoated region is extended from one end to the other end along the lengthwise direction of the first electrode when viewing the first electrode in unfolded state. The first electrode uncoated region 11 may act as a first electrode tab. The first uncoated region 11 is on one surface of the electrode assembly 10. More specifically, the first uncoated region 11 is below the electrode assembly 10 accommodated in the housing 20 in the heightwise direction (parallel to the Z axis).

The second electrode includes a second conductive substrate and a second electrode active material layer formed on one or two surfaces of the second conductive substrate by coating. An uncoated region in which a second electrode active material is not coated exists at the other end of the second conductive substrate in the widthwise direction (parallel to the Z axis). The second electrode uncoated region is extended from one end to the other end along the lengthwise direction of the second electrode when viewing the second electrode in unfolded state. The second electrode uncoated region 12 may act as a second electrode tab. The second uncoated region 12 is on the other surface of the electrode assembly 10. More specifically, the second uncoated region 12 is on the electrode assembly 10 accommodated in the housing 20 in the heightwise direction (parallel to the Z axis).

That is, the first uncoated region 11 and the second uncoated region 12 are extended and protruded in the opposite directions along the heightwise direction of the electrode assembly 10 (parallel to the Z axis), i.e., the heightwise direction of the cylindrical battery 1 and are exposed beyond the separator.

Figure 8:
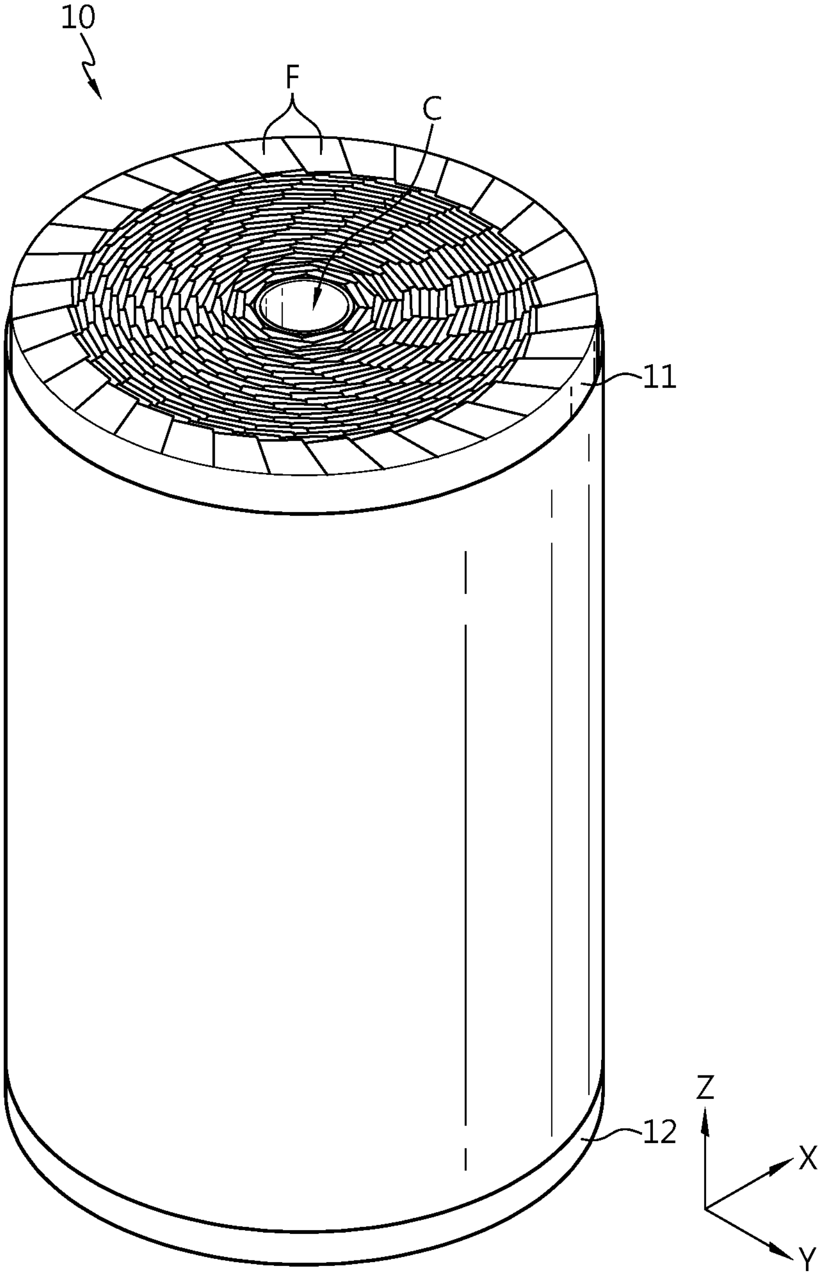
FIG. 8 is a diagram showing an electrode assembly having segments of the present disclosure.

Meanwhile, referring to FIG. 8, at least part of the first uncoated region 11 and/or the second uncoated region 12 may include a plurality of segments F split along the winding direction of the electrode assembly 10. In this case, the plurality of segments may be bent along the radial direction of the electrode assembly 10. The plurality of bent segments may overlap in multiple layers. In this case, the first current collector 60 and/or the second current collector 80 as described below may be coupled to an area in which the plurality of segments F overlaps in multiple layers. Meanwhile, the electrode assembly may have a welding target area in which the number of overlapping segments F of the first uncoated region 11 is maintained constant along the radial direction of the electrode assembly 10. Since the number of overlapping layers is approximately at the maximum in the area, welding between the first current collector 30 and the first uncoated region 11 and/or welding between the second current collector 70 and the second uncoated region 12 as described below may be performed in the area. For example, in case that laser welding is applied, it is to prevent damage to the electrode assembly 10 due to the laser beam passing through the first uncoated region 11 and/or the second uncoated region 12 when increasing the output of the laser to improve the weld quality. Additionally, it is to effectively prevent the filtration of impurities, for example, weld spatter, into the electrode assembly 10.

Referring to FIGS. 1 to 4, the battery housing 20 is an approximately cylindrical container having a partially closed portion on top and an open portion on bottom, and is made of a metal having conductive properties. The material of the battery housing 20 may be, for example, aluminum. The side and the upper surface of the battery housing may be integrally formed. The upper surface of the battery housing 20 has an approximately flat shape. The battery housing 20 accommodates the electrolyte together with the electrode assembly 10 through the open portion on bottom.

The battery housing 20 is electrically connected to the second uncoated region 12 of the electrode assembly 10. Accordingly, the battery housing 20 has the same polarity as the second uncoated region 12.

Figure 9:
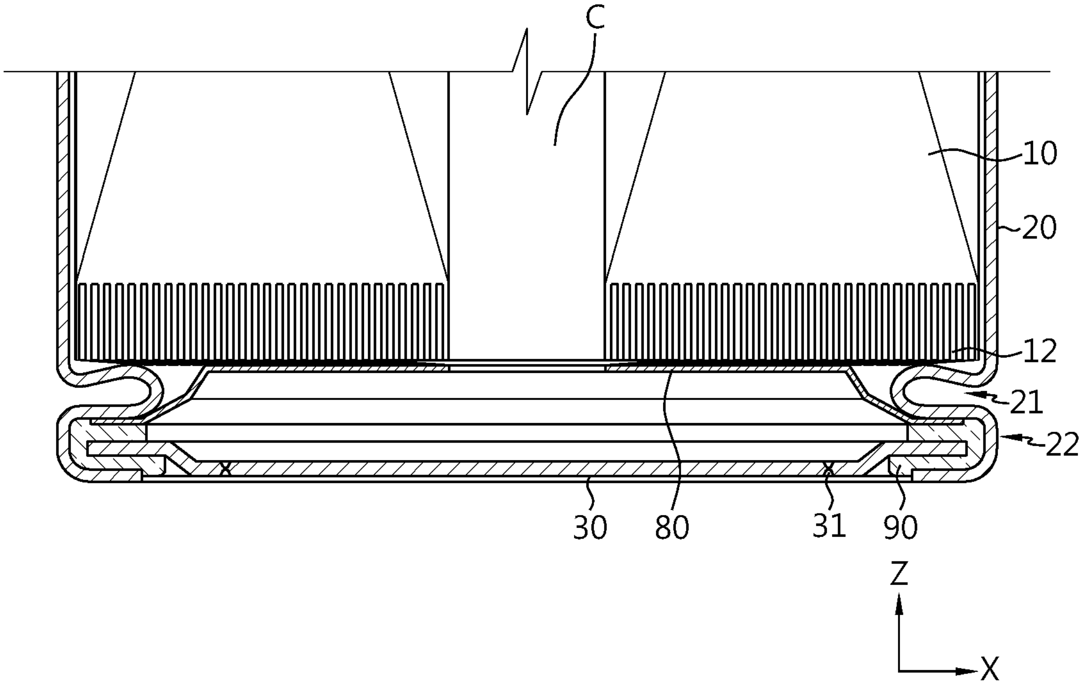
FIG. 9 is a partial cross-sectional view showing a bottom structure of a cylindrical battery according to an embodiment of the present disclosure.

Referring to FIGS. 2 and 9, the battery housing 20 may include a beading portion 21 and a crimping portion 22 formed at the lower end. The beading portion 21 is below the electrode assembly 10. The beading portion 21 is formed by press-fitting around the outer circumferential surface of the battery housing 20. The beading portion 21 may prevent the electrode assembly 10 having a size corresponding to the width of the battery housing 20 from exiting the open portion on bottom of the battery housing 20, and act as a support in which the cap 30 is seated.

The crimping portion 22 may be below the beading portion 21. The crimping portion 22 may be extended and bent such that an end defining the open portion of the battery housing 20 surrounds the edge of the cap 30 below the beading portion 21. The crimping portion 22 is extended and bent around the outer circumferential surface of the cap 30 below the beading portion 21 and a part of the lower surface of the cap 30.

The cap 30 may be a component made of a metal. The cap 30 covers the open portion on bottom of the battery housing 20. That is, the cap 30 forms a lower surface of the cylindrical battery 1. The cap 30 may be seated on the beading portion 21 of the battery housing 20, and may be fixed by the crimping portion 22. The sealing gasket 90 may be between the cap 30 and the crimping portion 22 of the battery housing 20 to ensure sealability of the battery housing 20.

The drawings of the present disclosure show that the battery housing 20 of the present disclosure includes both the beading portion 21 and the crimping portion 22, and the sealing gasket 90 is between the cap 30 and the battery housing 20. However, the present disclosure is not limited thereto.

That is, the battery housing 20 of the present disclosure may not include the beading portion 21 and/or the crimping portion 22. Additionally, the sealing gasket 90 may not be applied between the cap 30 and the battery housing 20 of the present disclosure.

When the battery housing 20 does not include the beading portion 21, the electrode assembly 10 may be fixed through the second current collector 80 as described below. Additionally, when the crimping portion 22 and/or the sealing gasket 90 is not applied, fixing the cap 30 and/or ensuring sealability of the open portion of the battery housing 20 may be achieved, for example, by weld coupling between the battery housing and the cap 30. That is, in the present disclosure, the battery housing 20 may be electrically isolated from the cap 30, and may be electrically connected to the cap 30. When the battery housing 20 is electrically connected to the cap 30, the second uncoated region 12 of the electrode assembly 10 may be electrically connected to the battery housing 20 through the cap 30, and may be electrically connected to the battery housing 20 without intervention of the cap 30. However, when the cap 30 is isolated from the battery housing 20, for example, by an insulating component such as the sealing gasket 90, the second uncoated region 12 of the electrode assembly 10 is not connected to the battery housing 20 through the cap 30.

Figure 10:
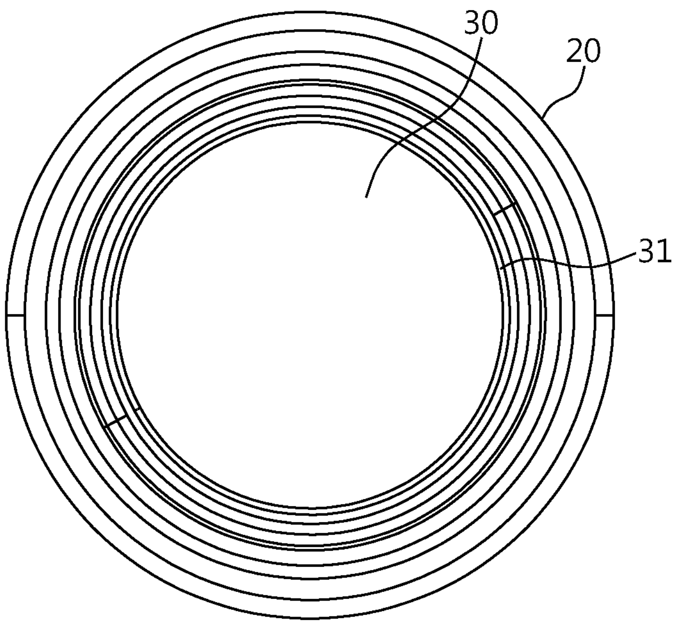
FIG. 10 is a diagram showing a lower surface of a cylindrical battery according to an embodiment of the present disclosure.

Meanwhile, referring to FIGS. 9 and 10, the cap 30 may further include a venting portion 31 to prevent the internal pressure from rising due to gas generated in the battery housing 20. The venting portion 31 corresponds to an area having a smaller thickness than any other area in the cap 30. The venting portion 31 is structurally weaker than the other areas. Accordingly, when the internal pressure rises above a predetermined level due to a fault in the cylindrical battery 1, the venting portion 31 ruptures to force gas generated in the battery housing 20 out.

The cylindrical battery 1 according to an embodiment of the present disclosure has a structure in which both the first electrode terminal having the first polarity and the second electrode terminal having the second polarity exist at the upper part as described below. As a consequence, the cylindrical battery 1 of the present disclosure has more complex upper structure than the lower structure. Accordingly, for smooth discharge of gas generated inside the battery housing 20, the venting portion 31 may be formed in the cap 30 that forms the lower surface of the cylindrical battery 1.

Although FIG. 10 of the present disclosure shows the venting portion 31 continuously formed in a circular shape on the cap 30, the present disclosure is not limited thereto. The venting portion 31 may be discontinuously formed in a circular shape on the cap 30, and may be formed in the shape of a straight line or other shapes.

Referring to FIGS. 1 to 3, the first electrode terminal 40 is made of a metal having conductive properties, and may pass through approximately the center of the upper surface of the battery housing 20. The first electrode terminal 40 passing through the partially closed portion of the battery housing 20 is electrically connected to the first uncoated region 11 of the electrode assembly 10 within the battery housing 20. Accordingly, the first electrode terminal 40 has the first polarity. The first electrode terminal 40 is electrically isolated from the battery housing 20 having the second polarity. The insulation between the first electrode terminal 40 and the battery housing 20 may be accomplished by a variety of methods. For example, the insulation between the two components may be accomplished by tightly fixing the first electrode terminal 40 to keep the first electrode terminal 40 and the battery housing 20 spaced apart from each other. Additionally, the insulation between the two components may be accomplished by forming a coating layer having insulating properties on a part of the first electrode terminal and/or the battery housing 20. Besides, as shown in the drawing of the present disclosure, the insulation between the first electrode terminal 40 and the battery housing may be accomplished by applying the insulation gasket 50 between the first electrode terminal 40 and the battery housing 20.

The first electrode terminal 40 includes a terminal exposure portion 41 and a terminal coupling portion 42. In addition to the above-described components, the first electrode terminal 40 may further include a flange portion 43. The dimeter of the terminal exposure portion 41 may be larger than the dimeter of the terminal coupling portion 42 or the sum of the dimeter of the terminal coupling portion 42 and the dimeter of the flange portion 43.

The terminal exposure portion 41 is exposed beyond the battery housing 20. The terminal exposure portion 41 may be at approximately the center of the upper surface of the battery housing 20. The terminal coupling portion 42 may be extended from approximately the center of the terminal exposure portion 41 to the first current collector 60. The terminal coupling portion 42 is electrically connected to the first uncoated region 11 through the center of the upper surface of the battery housing 20. Specifically, the terminal coupling portion 42 may be coupled to the first current collector 60 by bolt coupling.

Figure 5:
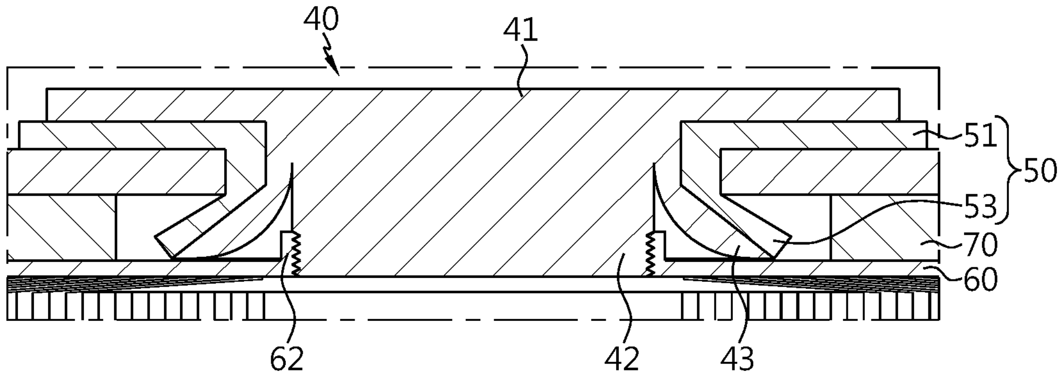
FIGS. 5 and 6 are diagrams showing a coupling structure of a first electrode terminal and a first current collector of the present disclosure.

Referring to FIG. 5, the terminal coupling portion 42 may be inserted into and bolt coupled to a current collector coupling portion 62 of the first current collector 60. In this case, the current collector coupling portion 62 may have a hole or a groove at the center, the hole running vertically or the groove formed to a predetermined depth from the upper surface thereof. The hole or groove may have screw threads for bolt coupling in at least part of the inner circumferential surface thereof. In addition, the terminal coupling portion 42 may have screw threads for bolt coupling in at least part of the outer circumferential surface thereof.

Figure 6:
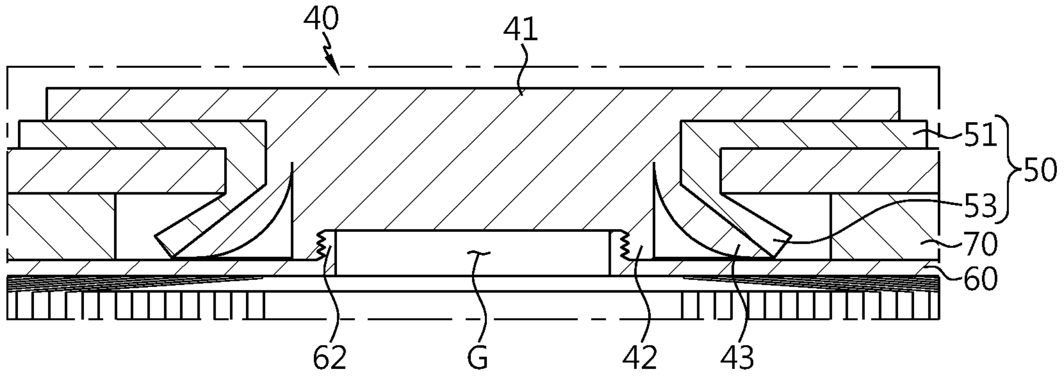

Referring to FIG. 6, as opposed to FIG. 5, the terminal coupling portion 42 may be bolt coupled to the outer circumferential surface of the current collector coupling portion 62 of the first current collector 60. In this case, the terminal coupling portion 42 may have a terminal groove G to a predetermined depth on the bottom thereof, and the terminal groove G may have screw threads for bolt coupling in at least part of the inner circumferential surface thereof.

The upper surface of the battery housing 20 and the upper surface of the terminal exposure portion 41 have the opposite polarities and face the same direction. Additionally, a step may be formed between the upper surface of the terminal exposure portion 41 and the upper surface of the battery housing 20. Specifically, when the entire upper surface of the battery housing 20 has a flat shape or protrudes upward from the center, the terminal exposure portion 41 of the first electrode terminal 40 may protrude upward above the upper surface of the battery housing 20. To the contrary, when the upper surface of the battery housing 20 is concavely recessed downward from the center, i.e., in a direction toward the electrode assembly 10, the upper surface of the battery housing 20 may protrude upward above the terminal exposure portion 41 of the electrode terminal 40.

Meanwhile, when the upper surface of the battery housing 20 is concavely recessed downward from the center, i.e., in a direction toward the electrode assembly 10, the upper surface of the battery housing 20 and the upper surface of the terminal exposure portion 41 may form the same plane according to the recess depth and the thickness of the terminal exposure portion 41 of the electrode terminal 40. In this case, a step may not be formed between the upper surface of the battery housing 20 and the terminal exposure portion 41.

The flange portion 43 may be in at least part of the outer periphery of the terminal coupling portion 42. The flange portion 43 may be bent in the inward direction of the battery housing 20 and come into close contact with the inner surface of the battery housing 20. Thus, the first electrode terminal 40 may be coupled to the battery housing by riveting.

The insulation gasket 50 is between the battery housing 20 and the first electrode terminal 40 to prevent the contact between the battery housing 20 and the first electrode terminal 40 having the opposite polarities. As previously described, the insulation between the battery housing 20 and the first electrode terminal 40 may be maintained by omitting the insulation gasket 50 and forming the insulating coating layer and/or ensuring the spacing between the components. However, when the insulation gasket 50 is applied, it is possible to ensure the insulation between the two components more reliably and ensure sealability of the battery housing 20. As described above, when the insulation between the first electrode terminal 40 and the battery housing 20 is maintained, the upper surface of the battery housing 20 having an approximately flat shape, i.e., the outer surface 20*a* of the partially closed portion of the battery housing 20, may act as the second electrode terminal of the cylindrical battery 1.

The insulation gasket 50 includes a gasket exposure portion 51 and a gasket insertion portion 53. The gasket exposure portion 51 is between the terminal exposure portion 41 of the first electrode terminal 40 and the battery housing 20 outside of the battery housing 20. The gasket insertion portion 53 is between the terminal coupling portion 42 of the first electrode terminal 40 and the battery housing 20 or between the flange portion 43 of the first electrode terminal 40 and the battery housing 20 inside of the battery housing 20. When the gasket insertion portion 53 is between the flange portion 43 and the battery housing 20, the gasket insertion portion 53 may come into close contact with the inner surface of the battery housing 20 by riveting together with the flange portion 43. That is, the gasket insertion portion 53 of the insulation gasket 50 may be bent together when bending and coupling to the flange portion 43 to the inner surface of the partially closed portion of the battery housing 20 by riveting to fix the first electrode terminal 40. Accordingly, the gasket insertion portion 53 between the inner surface of the partially closed portion of the battery housing 20 and the flange portion 43 may prevent the contact between the first electrode terminal 40 and the battery housing 20 having the opposite polarities. For example, the insulation gasket 50 may be made of a resin material having insulating properties.

Figure 4:
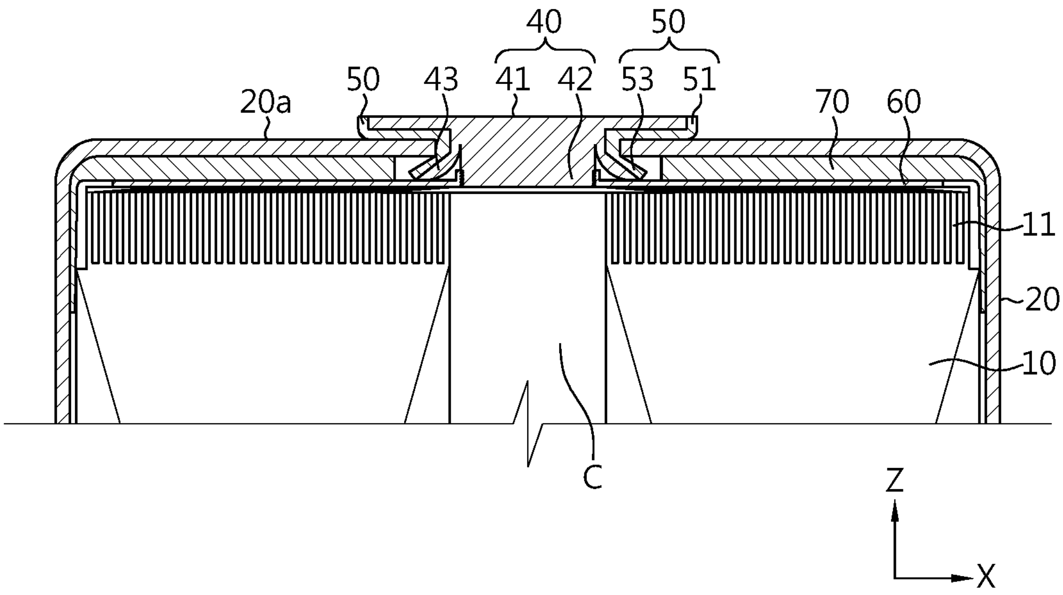

Referring to FIG. 4, the gasket exposure portion 51 of the insulation gasket 50 may be extended to cover the outer circumferential surface of the terminal exposure portion 41 of the first electrode terminal 40. When the insulation gasket 50 covers the outer circumferential surface of the first electrode terminal 40 as described above, it is possible to prevent a short circuit from occurring in the process of coupling an electrical connection component such as a busbar to the upper surface of the battery housing 20 and/or the first electrode terminal 40. Although not shown in the drawing, the gasket exposure portion 51 of the insulation gasket 50 may be extended to cover not only the outer circumferential surface of the terminal exposure portion 41 but also a part of the upper surface.

When the insulation gasket 50 is made of a resin material, the insulation gasket 50 may be coupled to the battery housing 20 and/or the first electrode terminal 40 by heat fusion. In this case, it is possible to enhance sealability at the coupling interface between the insulation gasket 50 and the battery housing 20 and/or the coupling interface between the insulation gasket 50 and the first electrode terminal 40. Meanwhile, when the gasket exposure portion 51 of the insulation gasket 50 is extended to the upper surface of the terminal exposure portion 41, the first electrode terminal 40 may be coupled to the insulation gasket 50 by insert injection molding.

The entire remaining area except the area occupied by the terminal exposure portion 41 of the first electrode terminal 40 and the insulation gasket 50 on the upper surface of the battery housing 20 may act as the second electrode terminal 20*a* having the opposite polarity to the first electrode terminal 40. That is, the cylindrical battery 1 of the present disclosure has a structure in which the pair of positive electrode terminal and negative electrode terminal is on one side of the battery housing 20, not the two sides of the battery housing 20. Accordingly, in connecting a plurality of cylindrical batteries 1 of the present disclosure, it is possible to form an electrical connection structure on only one side of the cylindrical battery 1, thereby achieving structural simplicity in the manufacture of a battery module and/or a battery pack. Additionally, the cylindrical battery 1 of the present disclosure has both the positive electrode terminal and the negative electrode terminal on a side opposite to the open side of the battery housing 20. Accordingly, the cylindrical battery of the present disclosure may solve the problem with insufficient coupling strength and/or increased electrical resistance that may occur by attaching the electrical connection component such as the busbar (not shown) to a narrow area such as the crimping portion 22 of the battery housing 20.

Referring to FIGS. 2 to 6, the first current collector 60 is coupled onto the electrode assembly 10. The first current collector 60 is made of a metal having conductive properties, and at least part of the lower surface facing the electrode assembly is coupled to the first uncoated region 11. Although the drawing shows the flat coupling surface of the first current collector 60 and the first uncoated region 11, as opposed to that of the drawing, the first current collector 60 may include a plurality of concave-convex patterns on the lower surface thereof. When the concave-convex patterns are formed, the concave-convex patterns may be pushed against the first uncoated region 11 by pressing the first current collector 60.

Figure 7:
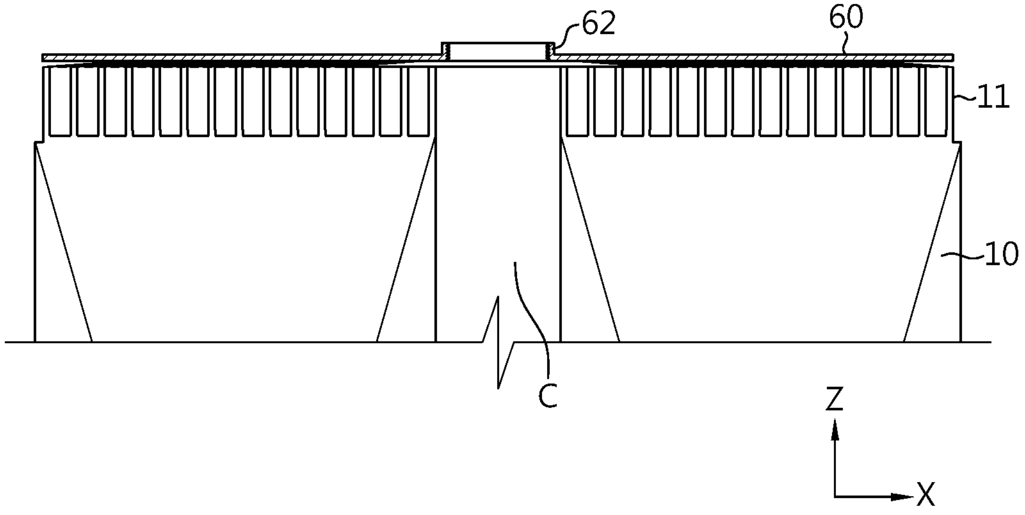
FIG. 7 is a diagram showing a coupling structure of a first current collector and an electrode assembly applied to the present disclosure.

Referring to FIG. 7, the first current collector 60 may be coupled to the end of the first uncoated region 11. The coupling between the first uncoated region 11 and the first current collector 60 may be accomplished, for example, by laser welding. The laser welding may be performed by partially melting the base material of the first current collector 60, and may be performed with solders for welding interposed between the first current collector 60 and the first uncoated region 11. In this case, the solders preferably have a lower melting point than the first current collector 60 and the first uncoated region 11.

The first current collector 60 may be coupled onto the coupling surface formed by bending the end of the first uncoated region 11 in a direction parallel to the first current collector 60. For example, the bent direction of the first uncoated region 11 may be a direction toward the winding center C of the electrode assembly 10. When the first uncoated region 11 has a bent shape as described above, it is possible to reduce the space occupied by the first uncoated region 11, thereby improving the energy density.

Referring back to FIGS. 5 and 6, the first current collector 60 is coupled to the first electrode terminal 40, and thereby electrically connects the first uncoated region 11 to the first electrode terminal 40. As described above, the first current collector 60 may be bolt coupled to the first electrode terminal 40. To this end, the first current collector 60 may include the current collector coupling portion 62 which is bolt coupled to the terminal coupling portion 42 of the first electrode terminal 40.

The current collector coupling portion 62 may be at approximately the center of the first current collector 60. The current collector coupling portion 62 may be at a location corresponding to the hole at the winding center C of the electrode assembly 10. The current collector coupling portion 62 may protrude in a direction toward the first electrode terminal 40. As shown in FIG. 5, for the terminal coupling portion 42 to be inserted into and bolt coupled to the current collector coupling portion 62, the current collector coupling portion 62 may have the screw threads on at least part of the inner circumferential surface thereof. As shown in FIG. 6, for the current collector coupling portion 62 to be inserted into and bolt coupled to the terminal coupling portion 42, the current collector coupling portion 62 may have the screw threads on at least part of the outer circumferential surface thereof.

Meanwhile, referring to FIGS. 5 to 7, the inner diameter of the current collector coupling portion 62 may be equal to or smaller than the inner diameter of the hole at the winding center C of the electrode assembly 10. This is to couple the first current collector 60 to all the first uncoated regions 11 along the radial direction of the electrode assembly 10, thereby minimizing the resistance rise and heat generation at the coupled part of the electrode assembly 10 and the first current collector 60. When the hole runs vertically at the center of the current collector coupling portion 62, the first current collector 60 may be coupled to the first uncoated region 11 only at other areas except the hole area. Accordingly, when the inner diameter of the current collector coupling portion 62 is smaller than the hole at the winding center C of the electrode assembly 10, the entire lower surface of the first current collector 60 may be coupled to the first uncoated region 11. However, the present disclosure is not limited thereto, and to reduce the resistance through the increased cross section of the first electrode terminal 40, the outer diameter of the terminal coupling portion 42 of the first electrode terminal 40 may be larger than the hole at the winding center C of the electrode assembly 10.

As described above, since the cylindrical battery 1 of the present disclosure has a structure in which the first current collector 60 and the first electrode terminal 40 are bolt coupled to each other, it is possible to omit a welding process for coupling of the two components. When the welding process is omitted, it is possible to minimize the dimeter of the hole at the winding center C of the electrode assembly 10. For welding between the first electrode terminal 40 and the first current collector 60, it is necessary to insert a welding rod or emit a laser from the bottom open portion of the battery housing 20 through the hole at the winding center C of the electrode assembly 10. To prevent damage to the electrode assembly 10 during the insertion of the welding rod or laser emission and achieve smooth welding, the dimeter of the hole at the winding center C may be equal to or larger than a predetermined level. With the decreasing dimeter of the hole at the winding center C, the area occupied by the electrode active material in the battery housing increases, and as a consequence, the energy density may increase.

Referring to FIGS. 2 to 6, the insulator 70 is between the first current collector 60 coupled onto the electrode assembly 10 and the inner surface of the battery housing 20. The insulator 70 prevents the contact between the first current collector 60 and the battery housing 20. The insulator 70 may further include an intervening portion between the outer circumferential surface of the electrode assembly 10 and the battery housing 20. The insulator 70 may have an approximately flat plate shape.

When the cylindrical battery 1 according to an embodiment of the present disclosure includes the insulator 70, the terminal coupling portion 42 of the first electrode terminal 40 is coupled to the first current collector 60 through the insulator 70.

Referring to FIGS. 2 and 9, the second current collector 80 is coupled to the bottom of the electrode assembly 10. The underlying current collector plate 80 is made of a metal having conductive properties and is connected to the second uncoated region 12. Additionally, the second current collector 80 is electrically connected to the battery housing 20. For example, the second current collector 80 may be fixed between the inner surface of the battery housing 20 and the sealing gasket 90. That is, the second current collector 80 may be fixed together with the cap 30 when forming the crimping portion 22 of the battery housing 20. Alternatively, the second current collector 80 may be welded to the inner wall of the battery housing 20. Meanwhile, the second current collector 80 may be coupled to the cap 30 without direct contact with the battery housing 20. In this case, the cap 30 is electrically connected to the battery housing 20.

Although not shown in the drawing, the second current collector 80 may include a plurality of concave-convex patterns on one surface thereof. When the concave-convex patterns are formed, the concave-convex patterns may be pushed against the second uncoated region 12 by pressing the second current collector 80.

In the same way as the coupling structure between the first current collector 60 and the first uncoated region 11 described above with reference to FIG. 7, the second current collector 80 is coupled to the end of the second uncoated region 12. The coupling between the second uncoated region 12 and the second current collector 80 may be accomplished, for example, by laser welding. The laser welding may be performed by partially melting the base material of the second current collector 80, and may be performed with solders for welding interposed between the second current collector 80 and the second uncoated region 12. In this case, the solders preferably have a lower melting point than the underlying current collector plate 80 and the second uncoated region 12.

In the same way as the coupling structure between the first current collector 60 and the first uncoated region 11 described above with reference to FIG. 7, the second current collector 80 may be coupled onto the coupling surface formed by bending the end of the second uncoated region 12 in a direction parallel to the second current collector 80. For example, the bent direction of the second uncoated region 12 may be a direction toward the winding center C of the electrode assembly 10. When the second uncoated region 12 has a bent shape as described above, it is possible to reduce the space occupied by the second uncoated region 12, thereby improving the energy density.

Figure 11:
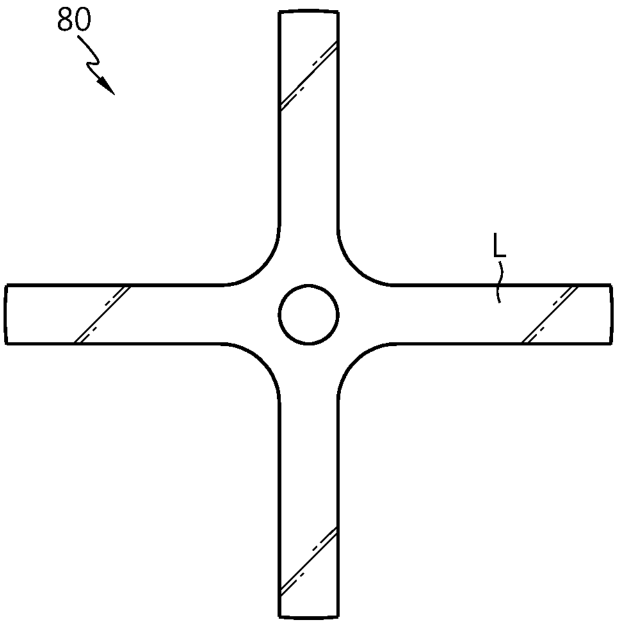
FIGS. 11 and 12 are diagrams showing a second current collector applied to the present disclosure.
Figure 12:
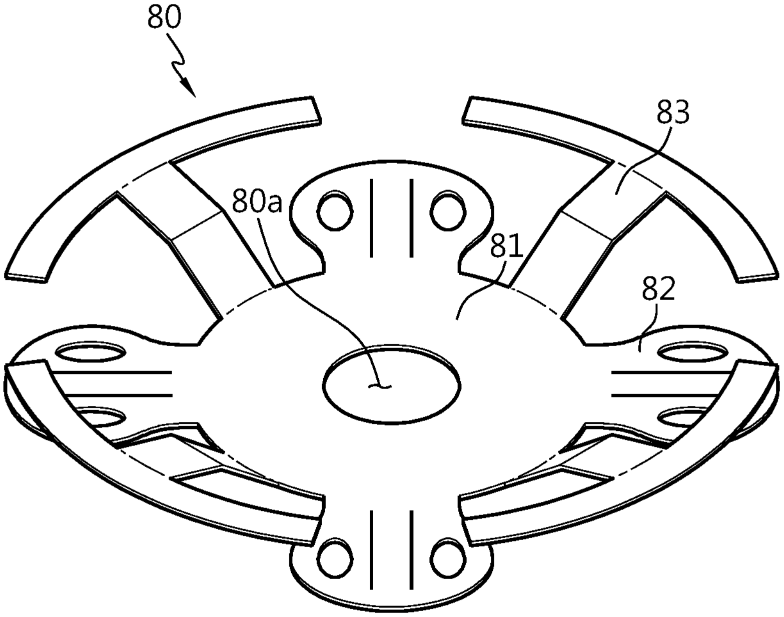

Referring to FIGS. 11 and 12 together with FIG. 9, the second current collector 80 is coupled to the second uncoated region 12 of the electrode assembly 10 and electrically connected to the battery housing 20. The second current collector 80 may include an uncoated coupling portion coupled to the second uncoated region 12 and a housing coupling portion coupled to the battery housing 20.

For example, the second current collector 80 may include a plurality of current collector legs L extended radially from the center and spaced apart from each other (see FIG. 11). In this case, each of the plurality of current collector legs 81 may be coupled to the second uncoated region 12 and the battery housing 20.

When the second current collector 80 includes the plurality of current collector legs 81 spaced apart from each other as described above, the second current collector 80 partially covers the lower surface of the electrode assembly 10. Accordingly, it is possible to ensure a sufficient space for gas generated in the electrode assembly 10 to move to the cap 30, and achieve smooth gas venting in the downward direction of the cylindrical battery 1.

For example, the second current collector 80 may include a support portion 81 below the electrode assembly 10, a second uncoated region coupling portion 82 extended along the approximately radial direction of the electrode assembly 10 from the support portion 81 and coupled to the second uncoated region 12, and a housing coupling portion 83 extended along the approximately radial direction of the electrode assembly 10 from the support portion 81 and coupled to the inner surface of the battery housing 20 (see FIG. 12). The second uncoated region coupling portion 82 and the housing coupling portion 83 may be indirectly connected through the support portion 81 without direct connection between them. In this case, it is possible to minimize the damage risk at the coupling part of the second current collector 80 and the electrode assembly 10 and the coupling part of the second current collector 80 and the battery housing 20 when external impacts are applied to the cylindrical battery 1 of the present disclosure. However, the second current collector 80 of the present disclosure is not limited to the indirect connection structure of the second uncoated region coupling portion 82 and the housing coupling portion 83. For example, the second current collector 80 may not include the support portion 81 indirectly connecting the second uncoated region coupling portion 82 to the housing coupling portion 83 and/or may have a direct connection structure of the second uncoated region 12 and the housing coupling portion 83.

The support portion 81 and the second uncoated region coupling portion 82 are below the electrode assembly 10. The second uncoated region coupling portion 82 is coupled to the second uncoated region 12 of the electrode assembly 10. Not only the second uncoated region coupling portion 82 but also the support portion 81 may be coupled to the second uncoated region 12. The second uncoated region coupling portion 82 and the second uncoated region 12 may be coupled by welding. The support portion 81 may include a current collector hole 80*a* at a location corresponding to the hole at the winding center C of the electrode assembly 10. The hole of the electrode assembly 10 and the current collector hole 80*a* in communication with each other may act as a passage for insertion of the welding rod or laser beam emission for welding between the terminal and the terminal coupling portion 63 of the first current collector 60. The current collector hole 80*a* may have a diameter that is substantially equal to or larger than the hole at the winding center C of the electrode assembly 10. When a plurality of second uncoated region coupling portions 82 is provided, the plurality of second uncoated region coupling portions 82 may be extended to the sidewall of the housing 20 approximately radially from the support portion 81 of the second current collector 80. Each of the plurality of second uncoated region coupling portions 82 may be spaced apart from each other along the periphery of the support portion 81. Meanwhile, to ensure the coupling strength and reduce the electrical resistance through the increased coupling area between the second current collector 80 and the electrode assembly 10, not only the second uncoated region coupling portion 82 but also the support portion 81 may be coupled to the second uncoated region 12.

The housing coupling portion 83 may be electrically coupled to one surface of the beading portion 21 facing the cap 30. A plurality of housing coupling portions 83 may be provided. In this case, the plurality of housing coupling portions 83 may be extended to the sidewall of the battery housing 20 approximately radially from the center of the second current collector 80. Accordingly, the electrical connection between the second current collector 80 and the battery housing 20 may be established at a plurality of locations. Since the coupling for electrical connection is made at the plurality of locations, it is possible to maximize the coupling area, thereby minimizing the electrical resistance.

As described above, as the cylindrical battery 1 according to an embodiment of the present disclosure includes the pair of electrode terminals 40, 20*a* in the same direction, in electrically connecting a plurality of cylindrical batteries 1, it is possible to place the electrical connection component such as the busbar on only one side of the cylindrical battery 1. This may lead to a simple battery pack structure and improved energy density.

Additionally, since the cylindrical battery 1 has a structure of making use of the outer surface of the partially closed portion of the battery housing 20 having an approximately flat shape as the second electrode terminal 20*a*, it is possible to ensure a sufficient bonding strength in joining the electrical connection component such as the busbar to the second electrode terminal 20*a*, and reduce the resistance at the joined part of the electrical connection component and the second electrode terminal 20*a* down to a desirable level.

Additionally, since the cylindrical battery 1 has the coupling between the first electrode terminal 40 and the first current collector 60 by bolt coupling, it is possible to omit the welding for coupling between the first electrode terminal 40 and the first current collector 60. Accordingly, the cylindrical battery 1 does not need to have a space for welding, thereby minimizing the dimeter of the hole at the winding center C of the electrode assembly 10, resulting in the improved energy density.

The cylindrical battery 1 of the present disclosure described above has a structure in which the resistance is minimized through the reduced electrical resistance using the first electrode terminal 40 and the first current collector 60, the increased weld area through the bend of the uncoated regions 11, 12, the current path diversity using the second current collector 80 and the minimized current path length. The AC resistance of the cylindrical battery 1 measured through a resistance meter between the positive electrode and the negative electrode, i.e., between the first electrode terminal 40 and the surrounding flat surface 20*a* may be approximately 0.5 milliohm to 4 milliohm, and preferably approximately 1 milliohm to 4 milliohm, suitable for fast charging.

Preferably, the cylindrical battery may have a ratio of form factor (a value obtained by dividing the diameter of the cylindrical battery by its height, i.e., defined as a ratio of diameter 1 to height H) larger than approximately 0.4.

Here, the form factor refers to a value indicating the diameter and height of the cylindrical battery. Preferably, the cylindrical battery may be approximately 40 mm to 50 mm in diameter, and approximately 60 mm to 130 mm in height. The cylindrical battery according to an embodiment of the present disclosure may be, for example, 46110 battery, 4875 battery, 48110 battery, 4880 battery, 4680 battery. In the numbers indicating the form factor, the former two numbers indicate the diameter of the battery, and the remaining numbers indicate the height of the battery.

In case that the electrode assembly having a tab-less structure is applied to the cylindrical battery having the ratio of form factor of more than 0.4, stress applied in the radial direction when bending the uncoated region is so large to cause the uncoated region to tear. Additionally, to ensure the sufficient weld strength and reduce the resistance when welding the current collector to the bent surface area of the uncoated region, it is necessary to sufficiently increase the number of stacks of the uncoated region at the bent surface area. These requirements may be achieved by the electrode and the electrode assembly according to the embodiments (variations) of the present disclosure.

The battery according to an embodiment of the present disclosure may be a battery having an approximately cylindrical shape with the diameter of approximately 46 mm, the height of approximately 110 mm and the ratio of form factor of approximately 0.418.

The battery according to another embodiment may be a battery having an approximately cylindrical shape with the diameter of approximately 48 mm, the height of approximately 75 mm and the ratio of form factor of approximately 0.640.

The battery according to another embodiment may be a battery having an approximately cylindrical shape with the diameter of approximately 48 mm, the height of approximately 110 mm and the ratio of form factor of approximately 0.418.

The battery according to another embodiment may be a battery having an approximately cylindrical shape with the diameter of approximately 48 mm, the height of approximately 80 mm, and the ratio of form factor of approximately 0.600.

The battery according to another embodiment may be a battery having an approximately cylindrical shape with the diameter of approximately 46 mm, the height of approximately 80 mm, and the ratio of form factor of approximately 0.575.

Conventionally, batteries having the ratio of form factor of approximately 0.4 or less have been used. That is, for example, 1865 battery and 2170 battery have been used. The 1865 battery has the diameter of approximately 18 mm, the height of approximately 65 mm and the ratio of form factor of approximately 0.277. The 2170 battery has the diameter of approximately 21 mm, the height of approximately 70 mm and the ratio of form factor of approximately 0.300.

Figure 13:
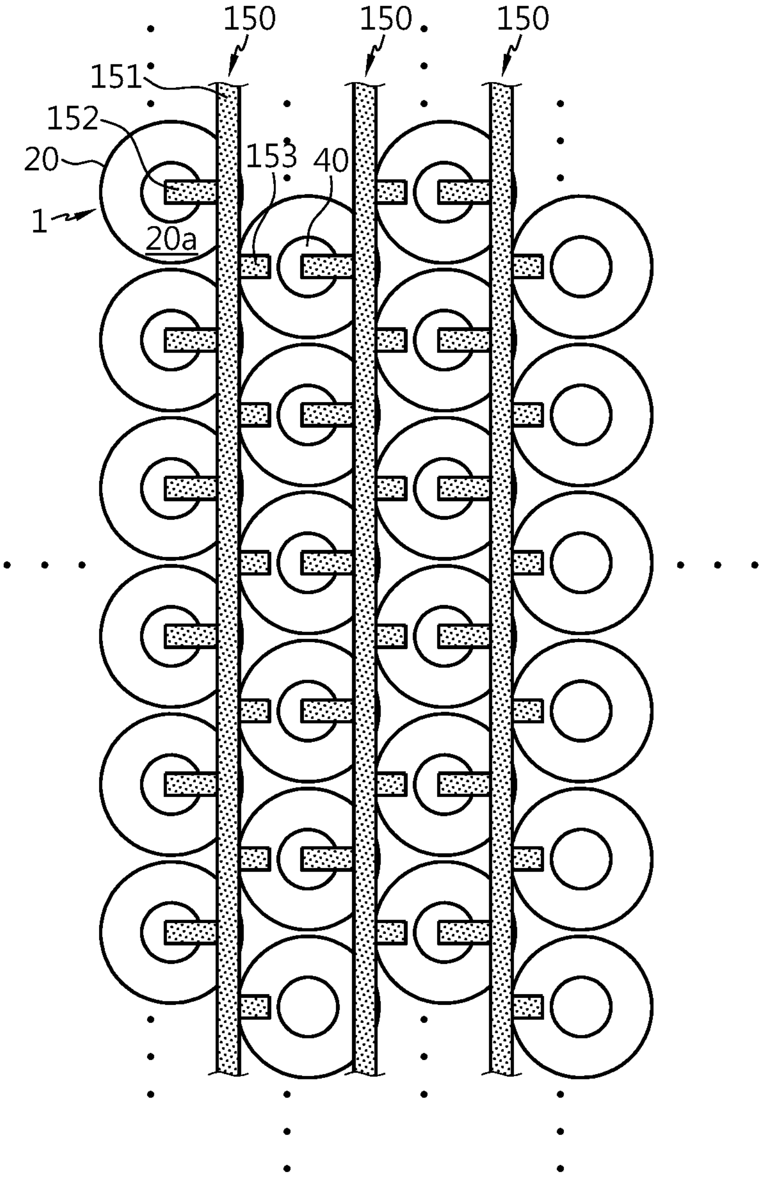
FIG. 13 is a top view showing a plurality of cylindrical batteries connected in series and in parallel using busbars according to an embodiment of the present disclosure.

Meanwhile, referring to FIG. 13, the plurality of cylindrical batteries 1 may be connected in series and in parallel using the busbars 150 on the cylindrical batteries 1. The number of cylindrical batteries 1 may be smaller or larger, considering the capacity of a battery pack.

In each cylindrical battery 1, the first electrode terminal 40 may have the positive polarity, and the outer surface 20*a* of the partially closed portion of the battery housing 20 may have the negative polarity, and vice versa.

Preferably, the plurality of cylindrical batteries 1 may be arranged in a plurality of columns and rows. The column is a vertical direction on the basis of the ground, and the row is a horizontal direction on the basis of the ground. Additionally, in order to maximize the space efficiency, the cylindrical batteries 1 may be arranged in a closest packing structure. The closest packing structure is formed by connecting the centers of the terminals 60 exposed beyond the battery housing 20 into an equilateral triangle shape. Preferably, the busbars 150 may be arranged on the plurality of cylindrical batteries 1, more preferably between adjacent columns. Alternatively, the busbars 150 may be arranged between adjacent rows.

Preferably, the busbar 150 connects in parallel the batteries 1 arranged in the same column, and connects in series the cylindrical batteries 1 arranged in two adjacent columns.

Preferably, the busbar 150 may include a body portion 151, a plurality of first busbar terminals 152 and a plurality of second busbar terminals 153 for serial and parallel connection.

The body portion 151 may be extended between the first electrode terminals 40 of the adjacent cylindrical batteries 1, and preferably between the columns of the cylindrical batteries 1. Alternatively, the body portion 151 may be extended along the columns of the cylindrical batteries 1 and may be bent regularly, for example, in a zigzag pattern.

The plurality of first busbar terminals 152 may be protruded and extended from one side of the body portion 151 to the first electrode terminal 40 of each cylindrical battery 1 and may be electrically coupled to the first electrode terminal 40. The electrical coupling between the first busbar terminal 152 and the first electrode terminal 40 may be made by laser welding and ultrasonic welding. Additionally, the plurality of second busbar terminals 153 may be electrically coupled to the outer surface 20*a* of each cylindrical battery 1 from the other side of the body portion 151. The electrical coupling between the second busbar terminal 153 and the outer surface 20*a* may be made by laser welding and ultrasonic welding.

Preferably, the body portion 151, the plurality of first busbar terminals 152 and the plurality of second busbar terminals 153 may be formed of a single conductive metal plate. The metal plate may be, for example, an aluminum plate or a copper plate, but the present disclosure is not limited thereto. In a variation, the body portion 151, the plurality of first busbar terminals 152 and the plurality of second busbar terminals 153 may be separately manufactured in the unit of a piece and then coupled to each other, for example, through welding.

Since the cylindrical battery 1 according to the present disclosure includes the first electrode terminal 40 having the positive polarity and the outer surface 20*a* of the partially closed portion of the housing 20 having the negative polarity in the same direction, it is possible to easily establish the electrical connection of the cylindrical batteries 1 using the busbars 150.

Additionally, since the first electrode terminal 40 of the cylindrical battery 1 and the outer surface 20*a* of the partially closed portion of the battery housing 20 have large areas, it is possible to ensure adequate coupling area of the busbars 150, thereby sufficiently reducing the resistance of the battery pack including the cylindrical batteries 1.

Figure 14:
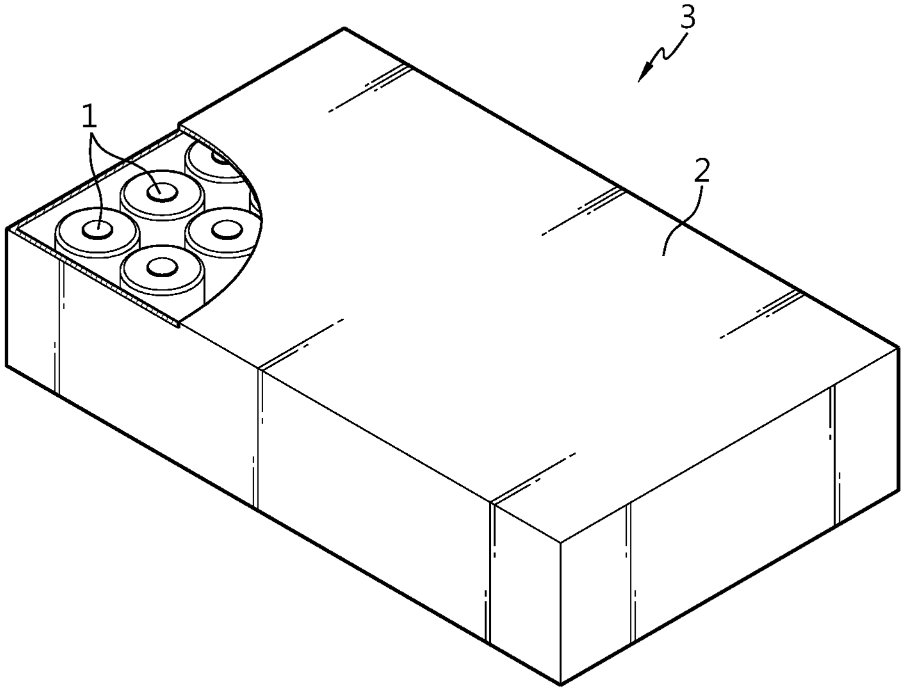
FIG. 14 is a schematic view showing a battery pack according to an embodiment of the present disclosure.

Referring to FIG. 14, the battery pack 3 according to an embodiment of the present disclosure includes a battery assembly including the plurality of cylindrical batteries 1 electrically connected according to an embodiment of the present disclosure as described above and a pack housing 2 to accommodate the battery assembly. The electrical connection structure of the plurality of batteries 1 through the busbars is described above with reference to FIG. 13 for illustrative purposes, and for convenience of illustration in the drawings, components such as a cooling unit and a power terminal are omitted.

Figure 15:
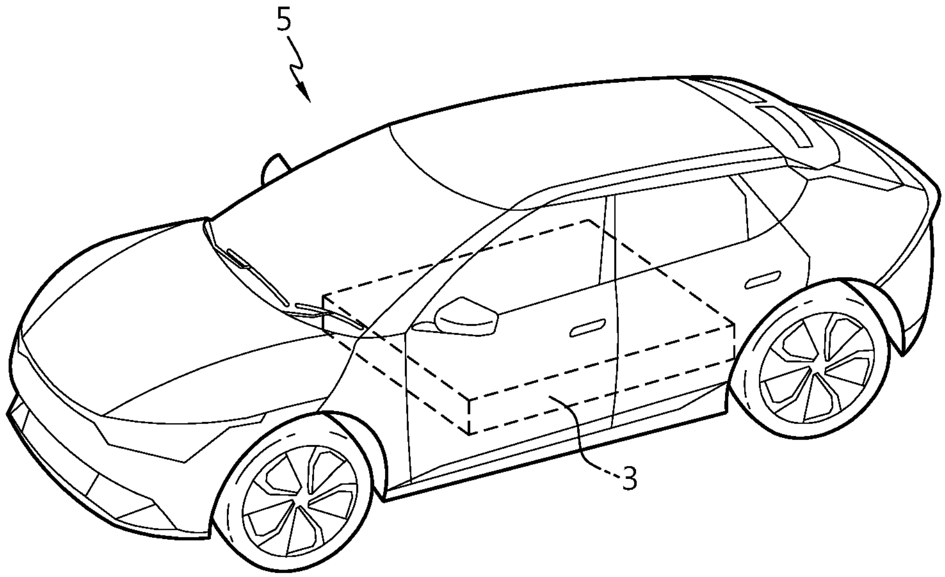
FIG. 15 is a conceptual diagram showing a vehicle according to an embodiment of the present disclosure.

Referring to FIG. 15, a vehicle 5 according to an embodiment of the present disclosure may be, for example, an electric vehicle, and includes the battery pack 3 according to an embodiment of the present disclosure. The vehicle 5 operates using the power supplied from the battery pack 3 according to an embodiment of the present disclosure.

While the present disclosure has been hereinabove described with regard to a limited number of embodiments and drawings, the present disclosure is not limited thereto and it is obvious to those skilled in the art that a variety of modifications and changes may be made thereto within the technical aspects of the present disclosure, the appended claims and their equivalent scope.

DESCRIPTION OF REFERENCE NUMERALS

- 5: Vehicle
- 3: Battery pack
- 2: Pack housing
- 1: Battery
- 10: Electrode assembly
- C: Winding center
- 11: First uncoated region
- 12: Second uncoated region
- 20: Battery housing
- 20*a*: Second electrode terminal (Outer surface of partially closed portion of battery housing)
- 21: Beading portion
- 22: Crimping portion
- 30: Cap
- 31: Venting portion
- 40: First electrode terminal
- 41: Terminal exposure portion
- 42: Terminal coupling portion
- G: Terminal groove
- 43: Flange portion
- 50: Insulation gasket
- 51: Gasket exposure portion
- 53: Gasket insertion portion
- 60: First current collector
- 62: Current collector coupling portion

70: Insulator
80: Second current collector
81: Current collector leg
90: Sealing gasket

What is claimed is:

1. A battery, comprising:

an electrode assembly including a first electrode, a second electrode and a separator between the first electrode and the second electrode, the first electrode, the second electrode and the separator being wound around a winding axis to define a core and an outer circumferential surface of the electrode assembly, wherein the first electrode and the second electrode include a first uncoated region and a second uncoated region in which an active material layer is not coated along a winding direction, respectively;

a battery housing accommodating the electrode assembly therein, the battery housing being electrically connected to the second uncoated region, the battery housing having an open portion and a partially closed portion opposite the open portion;

a cap covering the open portion of the battery housing;

a first electrode terminal passing athrough the partially closed portion of the battery housing, the first electrode terminal being electrically isolated from the battery housing, the first electrode terminal having a first polarity; and a first current collector coupled to the first uncoated region and connected to the first electrode terminal wherein the first electrode terminal and the first current collector are thread coupled.

2. The battery according to claim 1, wherein the first electrode terminal includes:

a terminal exposure portion exposed beyond the battery housing; and a terminal coupling portion coupled to the first current collector through the partially closed portion of the battery housing.

3. The battery according to claim 2, wherein the first current collector includes a current collector coupling portion bolt-thread coupled to the terminal coupling portion.

4. The battery according to claim 3, wherein the current collector coupling portion includes a hole or a groove at a center thereof.

5. The battery according to claim 4, wherein an inner diameter of the hole of the current collector coupling portion is equal to or smaller than an inner diameter of the core of the electrode assembly.

6. The battery according to claim 3, wherein the terminal coupling portion is inserted into and thread coupled to the current collector coupling portion.

7. The battery according to claim 3, wherein the current collector coupling portion is inserted into and thread coupled to the terminal coupling portion.

8. The battery according to claim 3, wherein the current collector coupling portion is at a center of the first current collector.

9. The battery according to claim 3, wherein the current collector coupling portion is at a location corresponding to the core of the electrode assembly.

10. The battery according to claim 2, wherein the first electrode terminal further includes a flange portion riveted to an inner surface of the battery housing through the partially closed portion of the battery housing.

11. The battery according to claim 1, further comprising an insulation gasket between the battery housing and the first electrode terminal.

12. The battery according to claim 11, wherein the first electrode terminal includes:

a terminal exposure portion exposed beyond the battery housing; and a terminal coupling portion coupled to the first current collector through the partially closed portion of the battery housing.

13. The battery according to claim 12, wherein the insulation gasket covers an outer circumferential surface of the terminal exposure portion.

14. The battery according to claim 11, wherein the insulation gasket is coupled to the battery housing and the first electrode terminal by heat fusion.

15. The battery according to claim 11, wherein the first electrode terminal is coupled to the insulation gasket by insert injection molding.

16. The battery according to claim 10, further comprising an insulation gasket between the battery housing and the first electrode terminal, wherein the flange portion is bent towards the battery housing such that the insulation gasket is located between the inner surface of the partially closed portion of the battery housing and the flange portion.

17. The battery according to claim 1, wherein an outer surface of the partially closed portion of the battery housing defines a second electrode terminal having a second polarity opposite to the first polarity of the first electrode terminal.

18. The battery according to claim 1, wherein at least part of the first uncoated region includes a plurality of segments split along the winding direction of the electrode assembly, and wherein the plurality of segments is bent along a radial direction of the electrode assembly.

19. The battery according to claim 18, wherein the plurality of bent segments overlaps in multiple layers along the radial direction.

20. The battery according to claim 19, wherein the electrode assembly has a welding target area in which the number of overlapping segments of the first uncoated region is maintained constant along the radial direction of the electrode assembly, and wherein a lower surface of the first current collector is coupled to the first uncoated region in the welding target area by welding.

21. The battery according to claim 1, further comprising a second current collector coupled to the second uncoated region, the second current collector being electrically connected to the battery housing.

22. The battery according to claim 21, wherein the second current collector includes:

an uncoated region coupling portion coupled to the second uncoated region; and a housing coupling portion coupled to an inner surface of the battery housing.

23. The battery according to claim 21, wherein the second current collector includes a current collector hole at a location corresponding to the core of the electrode assembly.

24. The battery according to claim 22, wherein the battery housing includes:

a beading portion adjacent an end of the open portion; and a crimping portion bent inward to provide an end defining the open portion, the end of the crimping portion overlapping an edge of the cap below the beading portion, and wherein the housing coupling portion is electrically coupled to one surface of the beading portion facing the cap.

25. The battery according to claim 22, wherein the housing coupling portion provided in plurality distribute an electrical connection between the electrode assembly and the battery housing.

26. The battery according to claim 1, wherein a resistance measured between the first electrode and the second electrode is 4 milliohms or less.

27. The battery according to claim 1, wherein a ratio of a diameter of the battery to a height of the battery is larger than 0.4.

28. A battery pack comprising a plurality of the batteries according to claim 1.

29. The battery pack according to claim 28, wherein the plurality of batteries is arranged in a predetermined number of columns, and wherein the first electrode terminal and the outer surface of the partially closed portion of the battery housing of each battery are positioned upward.

30. The battery pack according to claim 29, further comprising a plurality of busbars to connecting the plurality of batteries in series and in parallel, wherein the plurality of busbars are arranged on the plurality of batteries, and wherein each busbar includes:

a body portion extending between the first electrode terminals of adjacent batteries of the plurality of batteries;

a plurality of first busbar terminals extending from a first side of the body portion, the first busbar terminals being coupled to the first electrode terminals of the batteries arranged on the first side; and a plurality of second busbar terminals from a second side of the body portion opposite the first side, the plurality of second bus bar terminals being electrically coupled to the outer surfaces of the partially closed portions of the battery housings of the batteries arranged on the second side.

31. A vehicle comprising the battery pack according to claim 28.

32. A method of manufacturing a battery, the method comprising:

providing an electrode assembly including a first electrode, a second electrode and a separator between the first electrode and the second electrode, the first electrode, the second electrode and the separator being wound around a winding axis to define a core and an outer circumferential surface of the electrode assembly, wherein the first electrode and the second electrode include a first uncoated region and a second uncoated region in which an active material layer is not coated along a winding direction, respectively;

coupling a first current collector to the first uncoated region;

providing a battery housing having an open portion and a partially closed portion opposite the open portion;

attaching a first electrode terminal through the partially closed portion of the battery housing; and inserting the electrode assembly and the coupled first current collector through the open portion and thread coupling the first electrode terminal to the first current collector.

33. The method according to claim 32, wherein the first electrode terminal includes:

a terminal exposure portion exposed beyond the battery housing; and a terminal coupling portion coupled to the first current collector through the partially closed portion of the battery housing, and wherein the first current collector includes a current collector coupling portion thread coupled to the terminal coupling portion.

34. The method according to claim 33, wherein the terminal coupling portion is inserted into and thread coupled to the current collector coupling portion.

35. The method according to claim 33, wherein the current collector coupling portion is inserted into and thread coupled to the terminal coupling portion.

* * * * *